(12) United States Patent
Suzuki

(10) Patent No.: US 8,035,642 B2
(45) Date of Patent: Oct. 11, 2011

(54) APPARATUS AND METHOD FOR PROCESSING INFORMATION, AND PROGRAM FOR MAKING COMPUTER EXECUTE THE METHOD

(75) Inventor: Wataru Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 934 days.

(21) Appl. No.: 11/958,806

(22) Filed: Dec. 18, 2007

(65) Prior Publication Data

US 2008/0150947 A1    Jun. 26, 2008

(30) Foreign Application Priority Data

Dec. 22, 2006 (JP) ................... 2006-346197

(51) Int. Cl.
*G06T 11/60* (2006.01)
(52) U.S. Cl. ........................................................ 345/472
(58) Field of Classification Search .................... 345/472
See application file for complete search history.

(56) References Cited

U.S. PATENT DOCUMENTS

| 4,979,131 | A  | * | 12/1990 | Suzuki ........................ 358/1.17 |
| 5,506,941 | A  | * | 4/1996  | Kurumida .................... 358/1.11 |
| 5,708,768 | A  | * | 1/1998  | Horiuchi et al. .............. 345/471 |
| 6,081,831 | A  | * | 6/2000  | Miura ............................ 709/206 |
| 6,704,034 | B1 | * | 3/2004  | Rodriguez et al. ............ 715/860 |
| 2002/0048032 | A1 | * | 4/2002 | Ichikawa et al. .............. 358/1.11 |
| 2007/0250770 | A1 | * | 10/2007 | Gu et al. ...................... 715/542 |

FOREIGN PATENT DOCUMENTS

| JP | 04-278992 A | 10/1992 |
| JP | 10-083271 A | 3/1998 |

* cited by examiner

*Primary Examiner* — Javid Amini

(74) *Attorney, Agent, or Firm* — Canon U.S.A., Inc. I.P. Division

(57) ABSTRACT

In an apparatus and method for processing information, the font sizes of characters in display content are changed in different magnifications for each of the font sizes so as to display the content in a legible size when the size of the display area is changed. A program makes a computer execute the method.

6 Claims, 8 Drawing Sheets

```
<?xml version="1.0" standalone="no"?>

<!DOCTYPE svg PUBLIC "-//W3C//DTD SVG 20010904//EN"
        "http://www.w3.org/TR/2001/REC-SVG-20010904/DTD/svg10.dtd">

<svg width="480" height="360" xmlns="http://www.w3.org/2000/svg">

<text x="10" y="70"  font-size="70">ABCDEFGHI<text>

<text x="10" y="270" font-size="40">JKLMNOPQR<text>

<text x="10" y="350" font-size="20">STUVWXYZ<text>

</svg>
       401                402
```

APPARATUS AND METHOD FOR PROCESSING INFORMATION, AND PROGRAM FOR MAKING COMPUTER EXECUTE THE METHOD

BACKGROUND OF THE INVENTION

1. Field of the Invention

The present invention relates to an apparatus and method for processing information, in which display content containing characters is processed, and to a program for making a computer execute the method.

2. Description of the Related Art

In recent years, apparatuses have been increasingly equipped with displays. Such displays vary in size, from a size of a display for a small device to a size of a large screen. These displays display various pieces of information such as operator guidance, menus, and documents to provide the users with information.

A user sometimes changes the size of a display area to display a plurality of pieces of information. To view display content that has become larger than the display area as a result of a reduction in size of the display area, the user moves the display content using a scroll bar or the like. When display content contains characters, the user can output the display content by scrolling the characters in a display area. Further, for example, Japanese Patent Laid-Open Nos. 10-083271 and 4-278992 disclose methods in which the size of display content is changed in proportion to a change in size of a display area so that the display content is made to fit into the display area.

However, when information is to be displayed in a small display area, characters and images become small and the entirety of the information cannot be viewed. This has lead to poor legibility. For example, in the case where the size of display content that originally contains small characters is changed in proportion to a reduction in size of the display area, the characters become extremely small. Further, characters that cannot be displayed in a display area as a result of a reduction in size of a display area need to be scrolled. This has lead to a problem that it is difficult to grasp the entirety of the display content.

SUMMARY OF THE INVENTION

The present invention provides an apparatus and method for processing information, in which a decline in legibility of display content can be suppressed by adjusting the font sizes of character strings contained in display content individually depending on the original font sizes of the character strings. The present invention further provides a program for making a computer execute the method.

According to one aspect of the present invention, an information processing apparatus configured to display information containing characters includes a display-area-size acquisition unit configured to acquire a size of a display area; a font-size acquisition unit configured to acquire font sizes of the characters displayed in the display area; a font-size changing unit configured to change the font sizes of the characters acquired by the font-size acquisition unit in different magnifications for each of the font sizes when the size of the display area is changed; and a display configured to display the characters changed in font size in the display area changed in size.

According to another aspect of the present invention, an information processing method performed by an information processing apparatus configured to display information containing characters includes acquiring a size of a display area; acquiring font sizes of the characters displayed in the display area; changing the font sizes of the characters in different magnifications for each of the font sizes when the size of the display area is changed; and displaying the characters changed in font sizes in the display area changed in size.

According to another aspect of the present invention, an information processing method performed by an information processing apparatus configured to display information containing characters includes acquiring a size of a display area; acquiring font sizes of the characters displayed in the display area; changing the font sizes of the characters when the size of the display area is changed, wherein the font-size of at least one of the characters is changed by a different magnification than another of the characters; and displaying the characters changed in font sizes in the display area changed in size.

Further features of the present invention shall be apparent to those skilled in the art from the description of embodiments of the invention which follows. In the description, reference is made to accompanying drawings, which form a part thereof, and which illustrate examples of the invention. Such examples, however, are not exhaustive of the various embodiments of the invention, and therefore reference is made to the claims, which follow the description for determining the scope of the invention.

DESCRIPTION OF THE EMBODIMENTS

First Embodiment

Figure 1:
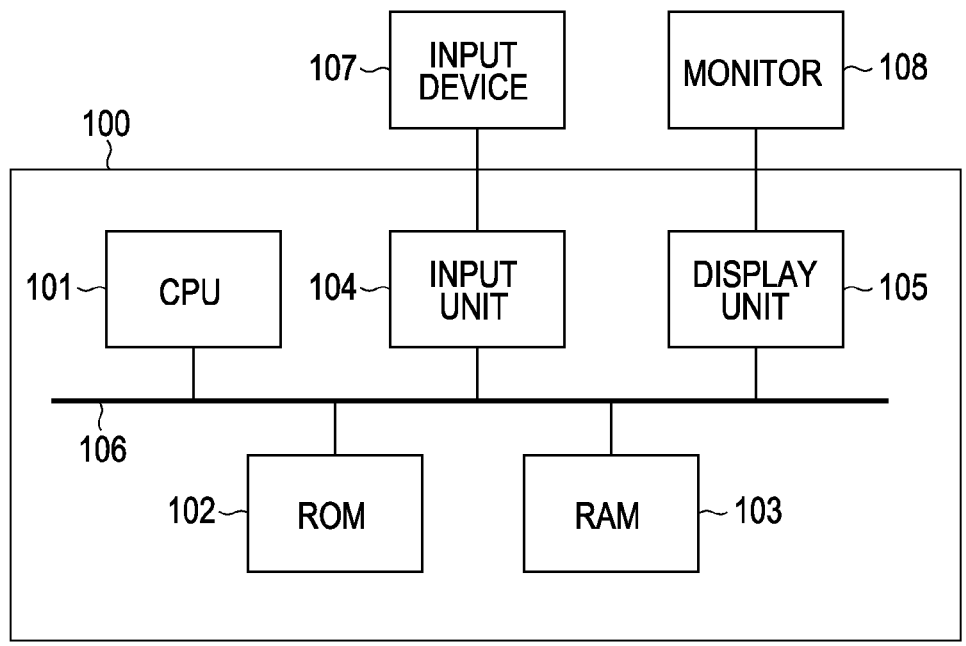
FIG. 1 illustrates a hardware configuration of an information processing apparatus according to an embodiment of the present invention.

Referring to a block diagram of FIG. 1, a configuration of an information processing apparatus according to a first embodiment of the present invention will be described. In FIG. 1, a central processing unit (CPU) 101 controls the entirety of an information processing apparatus 100. A read-only memory (ROM) 102 stores a program and parameter requiring no modification. A random access memory (RAM) 103 temporarily stores a program and data supplied from an external apparatus or the like. An input unit 104 functions as an interface with an input device 107, such as a pointing device, e.g., a mouse, and a keyboard that allow a user to input data. A display unit 105 functions as an interface with a monitor 108 for displaying data stored in the information processing apparatus 100 or data supplied thereto. A system bus 106 connects the units/devices 101 to 105 to allow communication therebetween. The configuration may further include a hard disk and memory card fixed to the information processing apparatus 100, an external storage apparatus that is removable from the information processing apparatus 100, a network interface that provides connection to a network such as the Internet, or the like.

Although the embodiment shows the case in which a program and the related data are directly loaded into the RAM 103 to be executed, the invention is not limited to such a case. For example, the program may be installed in a storage apparatus and loaded into the RAM 103 therefrom every time the program according to the embodiment is run. Alternatively, the program according to the embodiment may be recorded into the ROM 102 that is configured to reside in a memory map, so that the CPU 101 can directly execute the program.

Figure 2:
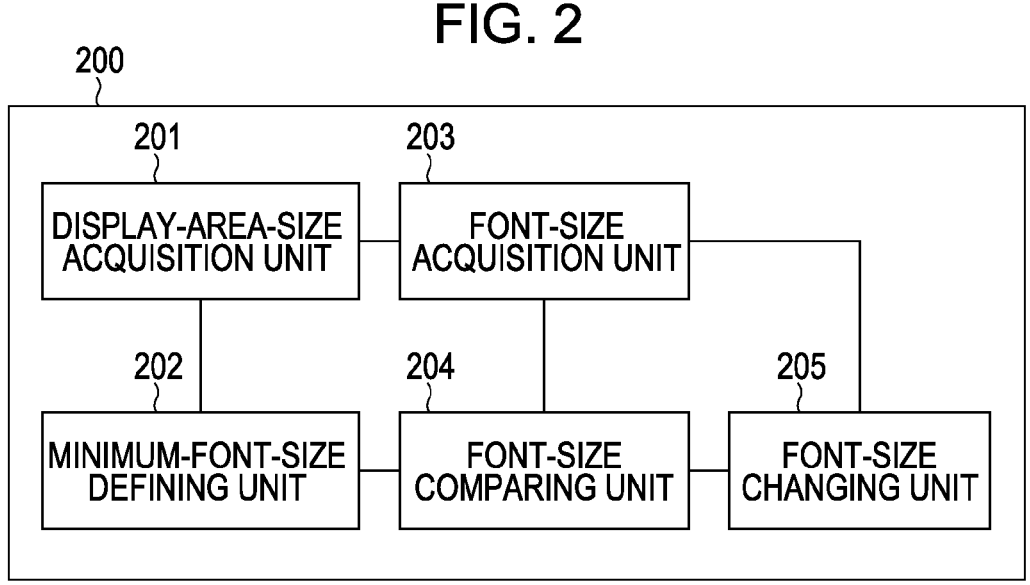
FIG. 2 illustrates a functional configuration of the information processing apparatus according to the embodiment.

FIG. 2 is a block diagram showing a functional configuration of the information processing apparatus 100 according to the embodiment. Functions of functional blocks shown in FIG. 2 are achieved by making the CPU 101 of the information processing apparatus 100 execute the program loaded into the RAM 103 and cooperate with hardware.

A display-area-size acquisition unit 201 acquires the size of a display area output on a display such as a monitor 108. A minimum-font-size defining unit 202 defines a minimum font size for the size of the display area acquired by the display-area-size acquisition unit 201. When the size of the display area is reduced, the font sizes are controlled so as not to become smaller than the minimum font size. A font-size acquisition unit 203 acquires the font sizes of character strings contained in display content that is changed in size so as to fit the size of the display area acquired by the display-area-size acquisition unit 201. A font-size comparing unit 204 compares the minimum font size defined by the minimum-font-size defining unit 202 and the font sizes acquired by the font-size acquisition unit 203. A font-size changing unit 205 changes the font sizes of the character strings acquired by the font-size acquisition unit 203 in accordance with a result of the comparison performed by the font-size comparing unit 204.

Figure 3:
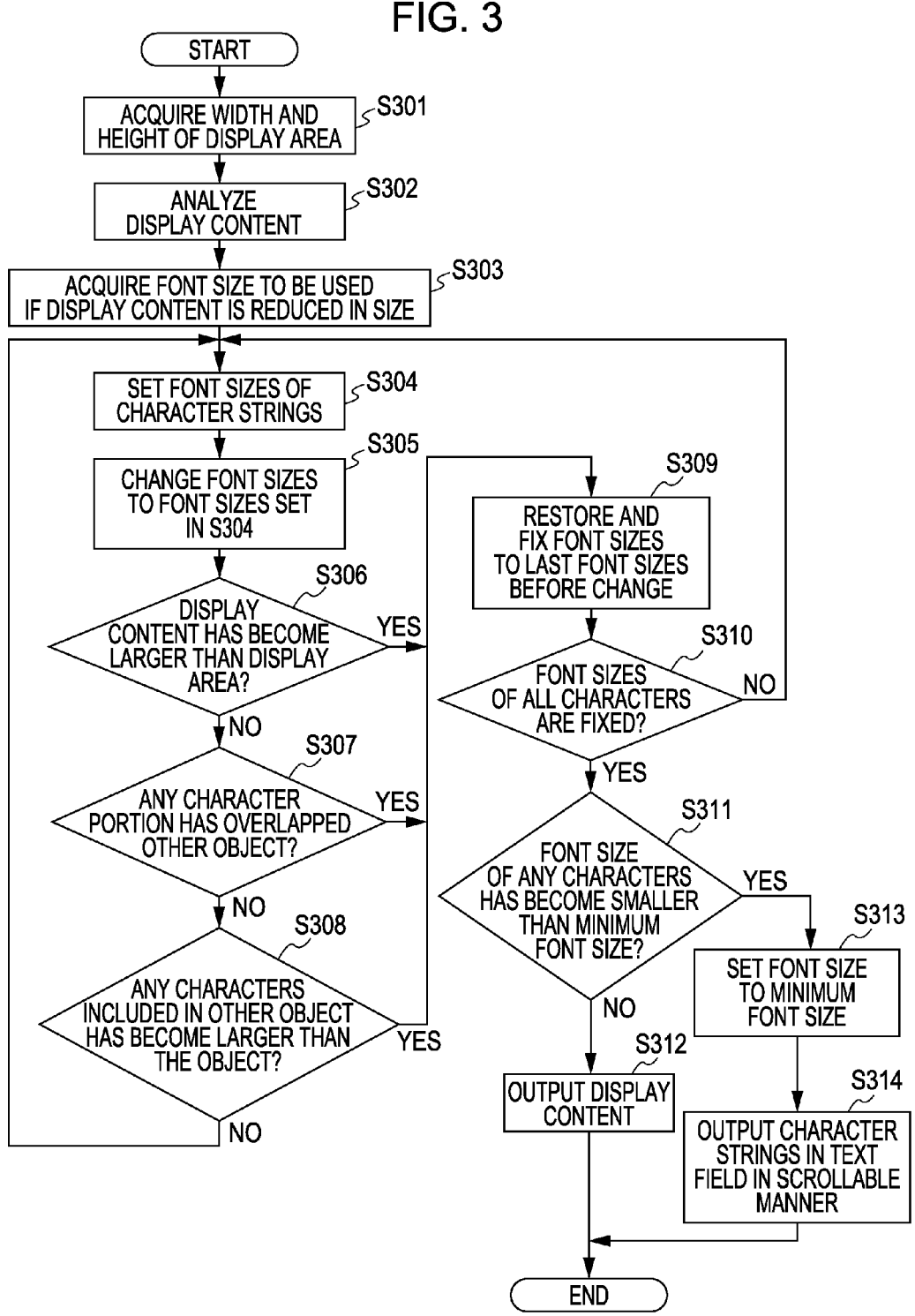
FIG. 3 is a flowchart showing an example of a process flow performed by the information processing apparatus according to the embodiment.

FIG. 3 is a flowchart showing an example of a process flow according to the embodiment. Referring to FIG. 3, the process flow will be described. In step S301, the size, specifically the width and height, of a display area for displaying display content is acquired.

In step S302, the display content is analyzed. Step S303 acquires the font sizes to be used if the display content is changed in size so as to fit the size of the display area acquired in step S301.

Figures 4, 5:
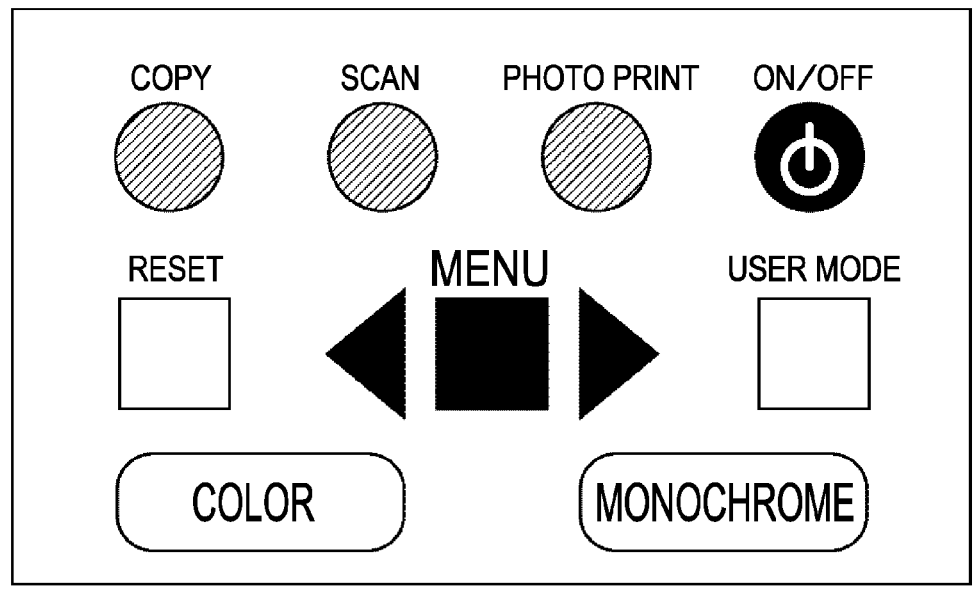
FIG. 4 illustrates an example of a structured document that indicates display content.
FIG. 5 illustrates an operation screen as an example of display content.

In step S302, when the display content is represented by a structured document as shown in FIG. 4, a structured-document analyzing apparatus analyzes the structured document to acquire the element name, attribute name, attribute value, and content of each element, and converts the above into data of an intermediate form. By referring to each character element, the attribute value regarding the font size is acquired in step S302. Examples of structured documents or data include, for example, extensible markup language (xml) coded documents and scalable vector graphics (SVG) data. In FIG. 4, text elements 401 correspond to the elements regarding character strings, and font-size attributes 402 correspond to the attributes regarding the font size.

Now, a method for setting the font sizes in step S304 will be described. For example, the font sizes of two character strings acquired in step S303 are 10 points and 20 points. These font sizes are reduced, for example, by 1 point at a time. If these font sizes are reduced by 2 points to become 8 points and 18 points, the font size that was originally 10 points has been reduced in size by 20%, and the font size that was originally 20 points has been reduced in size by 10%. In step S304, if the font is an outline font, which consists of a set of vectors, the magnification can be changed successively for each of the length and width of a character individually at any value.

In steps S311 and S313, which will be described below, if the font size of any character string will become smaller than the minimum font size, the font size is set so as not to become smaller than the minimum font size. The font sizes of the other character strings are changed. In the embodiment, for example, the minimum font size is 9 points. The minimum font size information may alternatively be preliminary contained in display content and is acquired in step S303. Alternatively, after the size of a display area is acquired in step S301, a user may set a minimum font size by operating an input device. Alternatively, a minimum font size may be determined by calculating the height of the minimum characters in proportion to the height of a display area.

Figure 8:
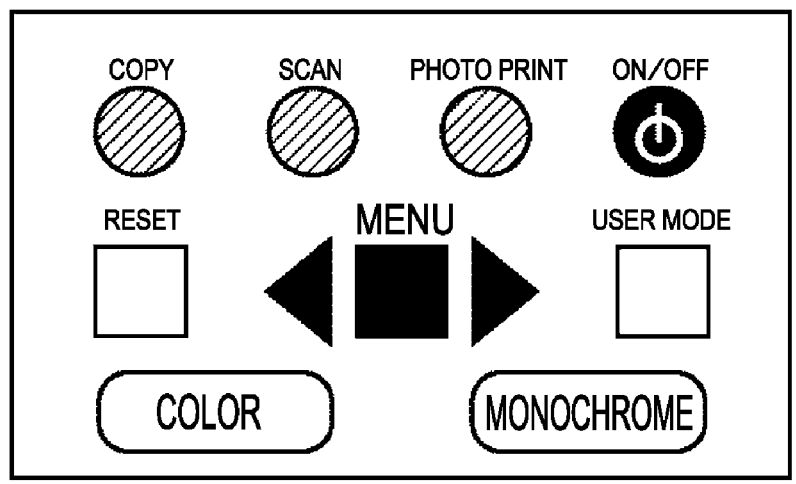
FIG. 8 illustrates an output result of the operation screen of FIG. 5 after a reduction in size of both the display area and font sizes by 50%.
Figure 9:
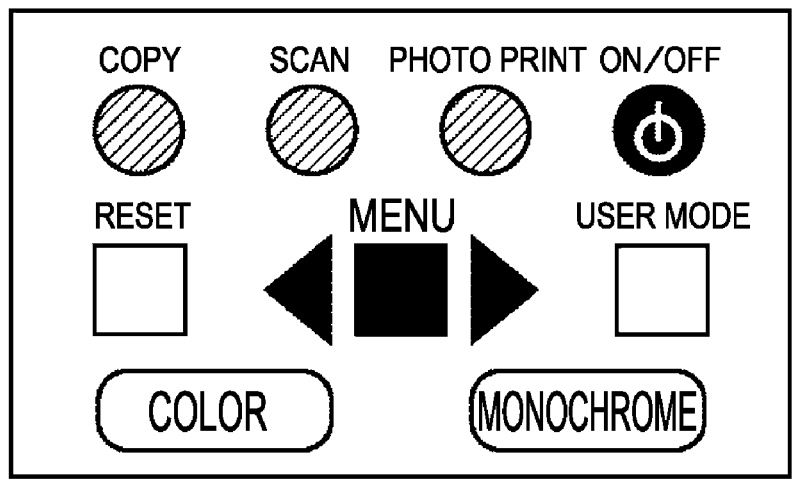
FIG. 9 illustrates an output result of the operation screen of FIG. 5 after a reduction in size according to an information processing method of the invention.

FIG. 9 illustrates a display screen of FIG. 5 as a result of a reduction in size according to the method of the invention. The font sizes of the character strings that were originally 10 points and 20 points have become about 9 points and 13 points, respectively. As shown in FIG. 8, if the length and width of the display area are reduced by 50% and the font sizes are also reduced by 50%, the font sizes that were originally 10 points and 20 points will become about 5 points and 10 points, respectively.

By changing the font sizes individually depending on the original font sizes and by setting a minimum font size, characters do not needlessly become small. Accordingly, character strings can be output while maintaining legibility and a size relationship therebetween.

Now, the process will be described more specifically. In step S305, the font sizes of the character strings are changed to the font sizes set in step S304, and a layout of the display content is determined. In step S306, whether or not the display content has become larger than the display area in the layout is determined. If the display content does not become larger than the display area, in step S307 whether or not any character string has overlapped an other object as a result of the change in font size is determined.

Figure 6:
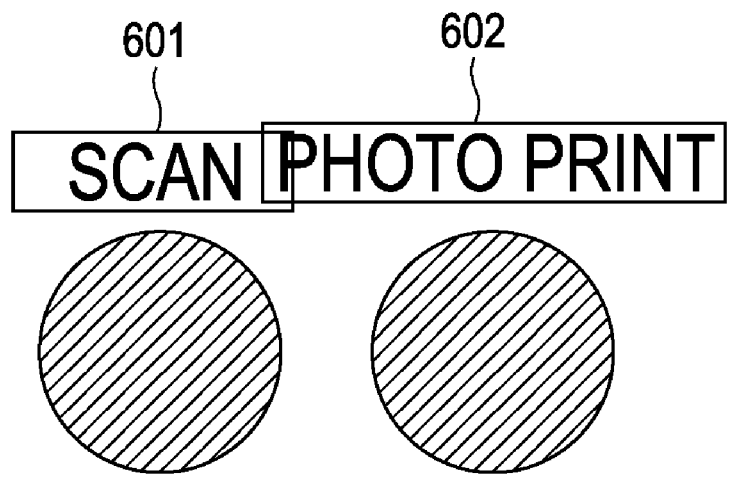
FIG. 6 illustrates a part of the display content of FIG. 5, showing an overlap between two character strings.

FIG. 6 illustrates a part of the operation screen of FIG. 5, showing a case in which two character strings in the display content overlap each other. Because the font sizes changed in step S305 are large, a minimum rectangular area surrounding a character string 601 overlaps that surrounding a character string 602. The character string 602 corresponds to the aforementioned other object. If it is determined that no character string has overlapped other object in step S307, the process proceeds to step S308. In step S308, it is determined whether or not any character string included in other object has become larger than the object as a result of the change in font size in step S305.

Figure 7:
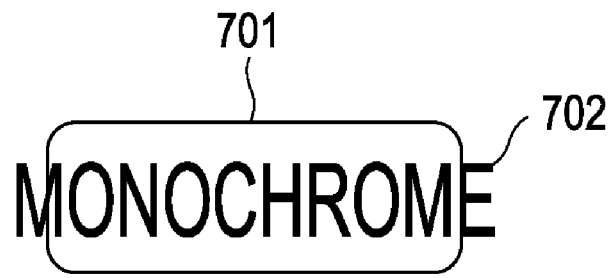
FIG. 7 illustrates a part of the display content of FIG. 5, showing a positional relationship between a character string and an object.

FIG. 7 illustrates a part of the operation screen of FIG. 5, in which a character portion 702 completely included in other object 701 has become larger than the object 701 as a result of an increase in size of the character portion 702. If in step S308 it is determined that no character string included in other object has become larger than the object, the process returns to step S304, where the font sizes are further set. If it is determined that the display content has become larger than the display area in step S306, or that any character string has overlapped other object in step S307, or that any character string included in other object has become larger than the object in step S308, legibility becomes poor. If determined so, the process proceeds to step S309, where the font sizes of the character strings are restored and fixed to the last font sizes before the change.

In the embodiment, if it is determined that a character string included in other object has become larger than the object in step S308, the font size of the character string is adjusted so that the character string becomes smaller than the object. Alternatively, the layout of the object may be adjusted so that the character string is included therein. In step S310, if there is any character string whose size is not fixed, the process returns to step S304. If the font sizes of all character strings are fixed, the process proceeds to step S311, where it is determined whether or not the font size of any character string has become smaller than the minimum font size as a result of restoring the font sizes in step S309. If it is determined that the font sizes of all the character strings are the minimum font size or larger in step S311, the process proceeds to step S312, where the display content is output in the display area and the process ends.

If it is determined that the font size of any character is smaller than the minimum font size in step S311, the process proceeds to step S313, where the font size is set to the minimum font size. In step S314, a text field is provided in an area that does not overlap other object, and the character strings are output in a scrollable manner and the process ends.

Thus, the size of the display area can be changed while maintaining size relationship between characters after a change in font size and other objects.

Second Embodiment

Figure 10:
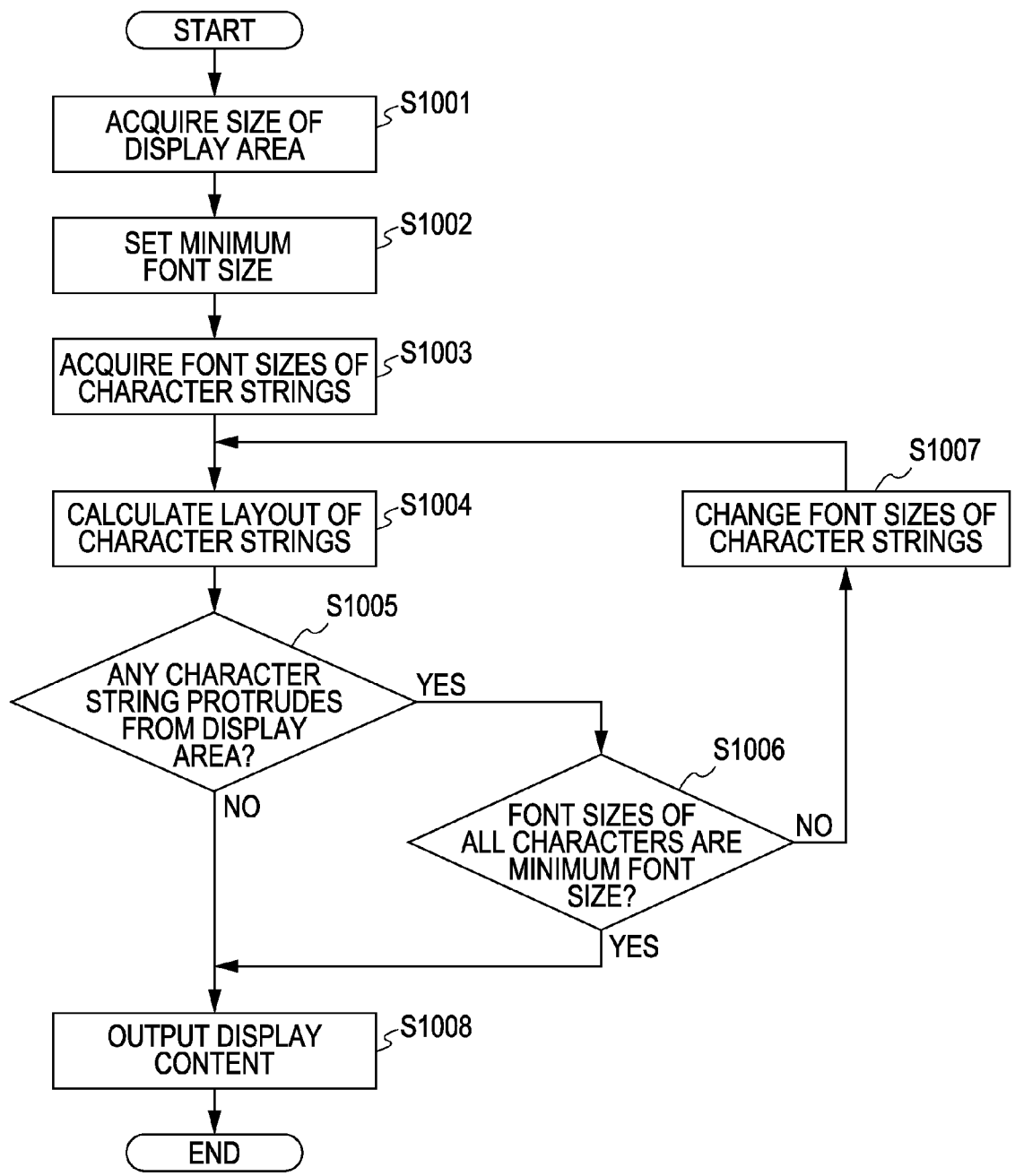
FIG. 10 is a flowchart showing an example of a process flow performed by an information processing apparatus according to another embodiment of the present invention.

The configuration of a computer apparatus that constitutes an information processing apparatus according to a second embodiment is the same as that according to the first embodiment, and thus, the description thereof will be omitted. FIG. 10 is a flowchart showing a process flow performed in the embodiment. Referring to FIG. 10, the process flow will be described.

In step S1001, the size, specifically the width and height, of the display area for displaying display content is acquired. In step S1002, a minimum font size for the display area is determined from the size of the display area acquired. Step S1003 acquires the font sizes of character strings contained in the display content that is output after changed in size so as to fit the size of the display area acquired in step S1001. A method for acquiring the font sizes is the same as that in the first embodiment.

In step S1004, a layout of the display content for the size of the display area acquired in step S1001 is calculated. In step S1005, whether or not any character string protrudes from the display area as a result of calculating the layout is determined. In step S1008, if it is determined that no character string protrudes from the display area, the display content is output on the display and the process ends. If it is determined that any character string protrudes from the display area in step S1005, the process proceeds to step S1006, where it is determined whether or not the font sizes of all character strings are the minimum font size. If it is determined that the font sizes of all the character strings are the minimum font size, the font sizes are not further changed, and the process proceeds to step S1008, where the character strings are output in the display area in the minimum font size. Using a scroll bar, a user can confirm the display content. If it is determined that there are characters larger than the minimum font size in step S1006, the process proceeds to step S1007, where the font sizes of the character strings are changed. The process then returns to step S1004 and repeats steps S1004 to S1007 until the display content becomes smaller than the display area or the font sizes of all the characters become the minimum font size.

Figure 11:
FIG. 11 illustrates an example of display content in which the display content is document information.
Figure 12:
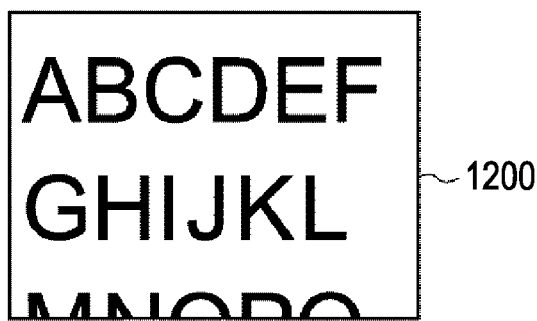
FIG. 12 illustrates an output result of the display content of FIG. 11 after a reduction in size of the display area alone.

FIG. 11 illustrates display content output on a display. For example, the font sizes of character strings 1101, 1102, and 1103 contained in display content 1100 are 70 points, 40 points, and 20 points, respectively. FIG. 12 illustrates a layout result of the display content 1100 of FIG. 11 in a display area whose width and length acquired in step S1001 are 50% of those of the display content shown in FIG. 11 but the font sizes of the character strings are not changed. In FIG. 12, because the font sizes are large, the display content has become larger than a display area 1200. The character strings 1102 and 1103 in FIG. 11 are not displayed in the display area 1200. When the window system is used, a scroll bar and the like are displayed, which further reduce the display area.

Figure 13:
FIG. 13 illustrates an output result of the display content of FIG. 11 after a reduction in size of display content in proportion to a change in size of the display area.

A common method for outputting display content so as to fit a display area has been changing the size of the display content in proportion to change in size of the display area. FIG. 13 shows display content output according to this method. The font sizes of character strings 1301, 1302, and 1303 have been reduced to about 35 points, 20 points, and 10 points, respectively. Although a size relationship between character strings is maintained, a character string whose font size was originally small, such as the character string 1303 has been further reduced in font size. Thus, it may become difficult to recognize such a character string.

Now, an exemplary method for changing the font sizes of character strings according to the embodiment will be described. A font size is set for each character string, and every time the font size is changed, the layout is renewed. In the embodiment, the values by which the font sizes are changed at a time are determined so that the font sizes of the characters become the minimum font size after a predetermined number of changes.

If the minimum font size set in step S1002 is 15 points and the font size is reduced by 1 point, the font size of a character which was originally 20 points becomes the minimum font size after five changes. Similarly, the font size of a character which was originally 40 points becomes the minimum font size after five reductions in size by 5 points at a time, and the font size of a character which was originally 70 points becomes the minimum font size after five reductions in size by 11 points at a time.

Figure 14:
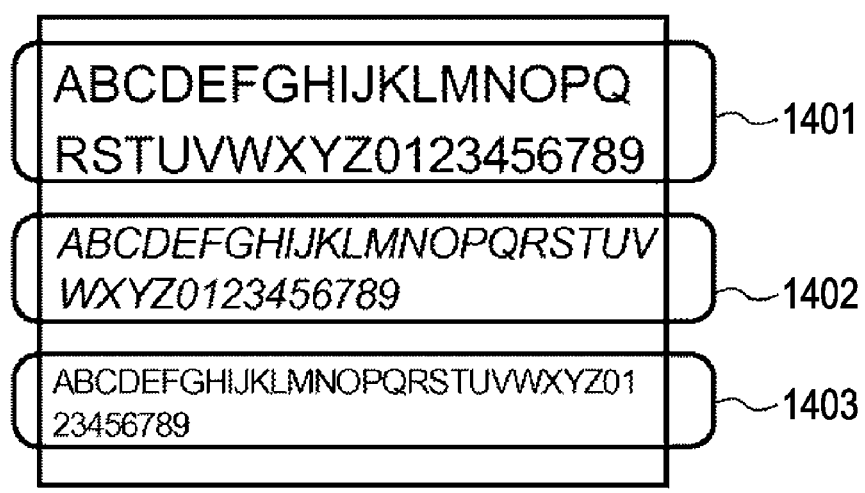
FIG. 14 illustrates an output result of the display content of FIG. 11 after a reduction in size according to the information processing method of the invention.

FIG. 14 shows an output result of display content output in a display according to the above method for changing font size and to the process flow shown in FIG. 10. The font sizes of character strings which were 70, 40, and 20 points are reduced to about 26, 20, and 16 points, respectively, after the fourth change. At the fifth change, the above font sizes become about 15, 15, and 15 points, respectively. The character whose original font size was large, i.e., 70 points, is reduced in font size by 11 points at a time, and the character whose original font size was small, i.e., 20 points, is reduced in font size only by 1 point at a time. Because the font sizes of all the characters are the minimum font size or larger (the minimum font size corresponds to 15 points), the display content can be output while maintaining legibility and a size relationship between character strings.

According to this method, a small character string in display content can be output in a display area while maintaining the size maximally. In the case of the outline font, the magnification can be set for each of the length and width individually, at any value.

Needless to say, the present invention can be implemented by providing a system or an apparatus with a storage medium that records program code of software for providing the functions as described in the above embodiments, and by making a computer (or a CPU or a microprocessor unit) of the system or the apparatus read the program code stored in the storage medium and execute the program. In this case, the program code read from the storage medium provides the functions as described in the above embodiments, and the storage medium constitutes the present invention.

The storage medium that provides the program code may be, for example, a flexible disk, a hard disk, an optical disk, a magneto-optical disk, a compact disc read-only memory (CD-ROM), a compact disc recordable (CD-R), a magnetic tape, a nonvolatile memory card, a ROM, and a digital versatile disc (DVD).

Of course, the functions as described in the above embodiments can be provided not only by making a computer read the program code and execute the program, but also by making an operating system (OS) of the computer perform a part of or the entirety of the process under the instruction of the program code.

Further, the functions as described in the above embodiments can also be provided by making a CPU installed in a function expansion board inserted in the computer or a function expansion unit connected to the computer perform a part of or the entirety of the process under the instruction of the program code, after the program code read from the storage medium is written in the memory of the function expansion board or the function expansion unit.

Although various embodiments of the present invention have been described with particularity, many apparently widely different embodiments of the invention can be made without departing from the spirit and the scope thereof. It is to be understood that the invention is not limited to the specific embodiments thereof except as defined in the claims.

This application claims the benefit of Japanese Application No. 2006-346197 filed Dec. 22, 2006, which is hereby incorporated by reference herein in its entirety.

What is claimed is:

1. An information processing apparatus configured to display a display content containing characters, the information processing apparatus comprising:
    a display-area-size acquisition unit configured to acquire a size of a display area for displaying the display content;
    a font-size acquisition unit configured to acquire a font size of the characters included in the display content which is reduced or enlarged so as to fit the display area size
    a setting unit configured to set a changed value of the font size;
    a layout unit configured to perform a layout of the display content by changing the font size based on the set changed value;
    a first determination unit configured to determine whether or not the display content has become larger than the display area by performing the layout;
    a second determination unit configured to determine whether or not a character has overlapped with another character by performing the layout;
    a display unit configured to display the display content in the font size which is before the changing based on the set changed value is performed, in a case wherein the first determination unit determines that the display content has become larger than the display area by performing the layout and/or the second determination unit determines that a character has overlapped with another character by performing the layout,
    wherein in a case where the first determination unit determines that the display content has not become larger than the display area by performing the layout and the second determination unit determines that a character has not overlapped with another character by performing the layout, the changed value of the font size is re-set by the setting unit and a layout is performed by the layout unit based on the re-set changed value.

2. The information processing apparatus according to claim 1, wherein the font-size acquisition unit acquires the font sizes of characters from characters information described in structured data.

3. The information processing apparatus according to claim 2, wherein the structured data is scalable vector graphics (SVG) data.

4. The information processing apparatus according to claim 2, wherein the font-size acquisition unit acquires each font size by referring to an attribute of an element containing the character information.

5. An information processing method performed by an information processing apparatus configured to display a display content containing characters, the method comprising:
    acquiring a size of a display area for displaying the display content;
    acquiring a font size of the characters included in the display content which is reduced or enlarged so as to fit the display area size
    setting a changed value of the font size;
    performing a layout of the display content by changing the font size based on the set changed value;
    determining whether or not the display content has become larger than the display area by performing the layout;
    determining whether or not a character has overlapped with another character by performing the layout;
    displaying the display content in the font size which is before the changing based on the set changed value is performed, in a case wherein the display content is determined to have become larger than the display area by performing the layout and/or a character is determined to have overlapped with another character by performing the layout,
    wherein in a case where the display content is determined to have not become larger than the display area by performing the layout and a character is determined to have not overlapped with another character by performing the layout, the changed value of the font size is re-set and a layout is performed based on the re-set changed value.

6. A program embodied in a medium readable by a machine, the program for making the machine execute the information processing method according to claim 5.

* * * * *